United States Patent [19]

Chiu

[11] Patent Number: 4,621,365

[45] Date of Patent: Nov. 4, 1986

[54] SYNCHRONIZATION PREAMBLE CORRELATION DETECTOR AND FREQUENCY ESTIMATOR

[75] Inventor: Chen-Shu Chiu, Placentia, Calif.

[73] Assignee: Hughes Aircraft Company, Los Angeles, Calif.

[21] Appl. No.: 672,215

[22] Filed: Nov. 16, 1984

[51] Int. Cl.⁴ .............................................. H04K 1/00
[52] U.S. Cl. ...................................... 375/1; 364/728; 375/96; 375/115
[58] Field of Search ................... 375/1, 115, 96, 83, 375/86; 364/728, 107; 370/107; 343/5 PN, 378; 455/207, 214; 329/112; 328/162, 163

[56] References Cited

U.S. PATENT DOCUMENTS

| | | | |
|---|---|---|---|
| 3,614,623 | 10/1971 | McAuliffe | 375/96 |
| 3,944,929 | 3/1976 | Matsuo | 455/145 |
| 4,007,331 | 2/1977 | Flanagan | 364/728 |
| 4,022,973 | 5/1977 | Stackhouse et al. | 375/114 |
| 4,112,372 | 9/1978 | Holmes et al. | 375/1 |
| 4,188,580 | 2/1980 | Nicolai et al. | 179/1.5 R |
| 4,244,026 | 1/1981 | Dickey, Jr. | 364/728 |
| 4,291,410 | 9/1981 | Caples et al. | 375/1 |
| 4,346,475 | 8/1982 | Alexis | 364/728 |
| 4,398,062 | 8/1983 | McRae et al. | 375/13 |
| 4,424,514 | 1/1984 | Fennell et al. | 340/825.52 |
| 4,430,742 | 2/1984 | Milleker et al. | 375/5 |
| 4,453,259 | 6/1984 | Miller | 375/106 |
| 4,484,335 | 11/1984 | Mosley | 375/1 |
| 4,528,674 | 7/1985 | Sweeney et al. | 375/96 |

Primary Examiner—Robert L. Griffin
Assistant Examiner—Stephen Chin
Attorney, Agent, or Firm—Howard R. Lambert; Anthony W. Karambelas

[57] ABSTRACT

A device is disclosed which simultaneously performs sync preamble correlation detection and frequency offset estimation functions for a spread spectrum receiver. The device performs a parallel frequency search, executed by a plurality of frequency sensitive circuit channels connected in parallel. These parallel circuit channels first apply phase corrections to the subcorrelator outputs and then linearly reintegrate the corrected outputs. In each channel the phase corrections applied to each successive subcorrelator output vary with the frequency offset subregions to which the channel is designed to match. By applying approximated phase corrections of 0°, 90°, 180° or 270° in lieu of the exact phase corrections required to remove the phase shift, the need for multiplication operations in the reintegration process is eliminated, as well as the need for storing large numbers of weighting coefficients. As a result, the reintegration process involves only addition and subtraction operations and the non-linear integration process is eliminated. The detector also establishes an estimate of the input signal frequency offset at the time of detection of the preamble correlation.

18 Claims, 14 Drawing Figures

Fig. 5.
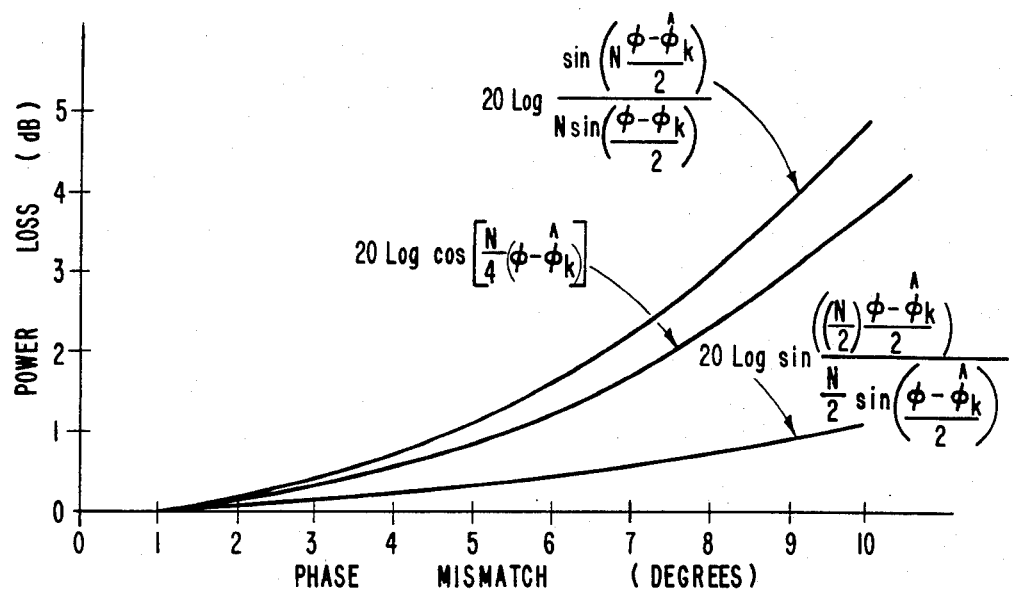
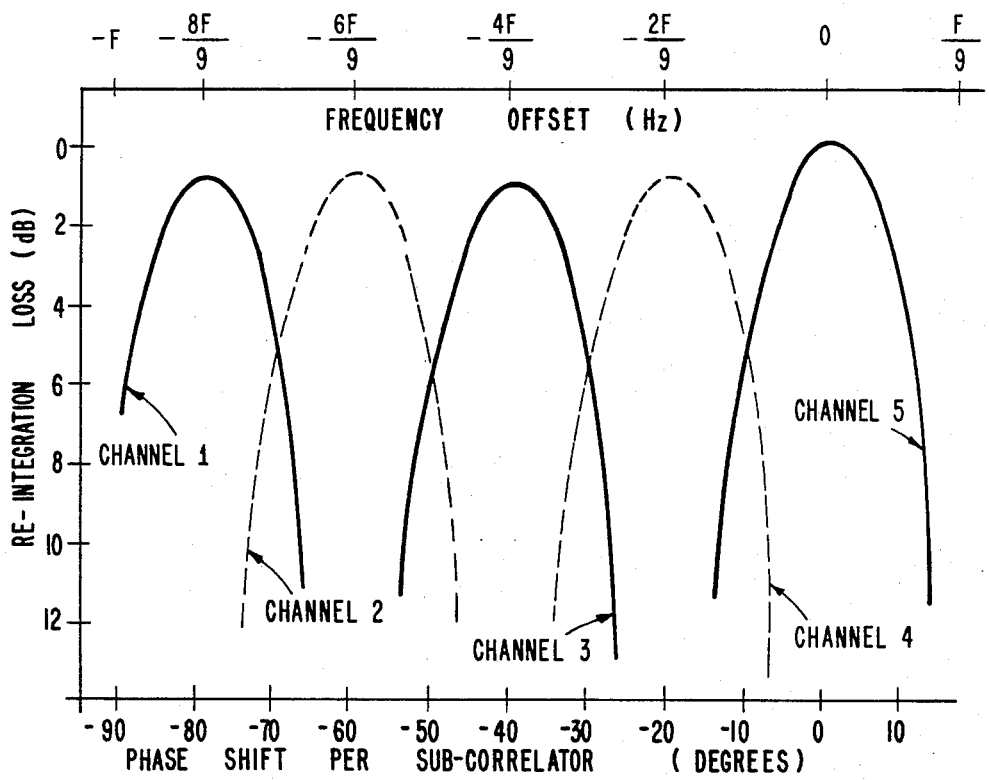
Fig. 6.

SYNCHRONIZATION PREAMBLE CORRELATION DETECTOR AND FREQUENCY ESTIMATOR

BACKGROUND OF THE INVENTION

The present invention is related to spread spectrum communication systems.

Spread spectrum communication systems use much wider spectral bandwidths than theoretically necessary, spreading the transmitted energy over the wide bandwidth to reduce the possibility of unauthorized detection and to obtain other well known benefits. There exist at least two basic spread spectrum techniques, the frequency hopping and the psuedonoise (PN) encoding techniques. The present invention relates to the latter technique.

In the typical PN technique, a pseudorandom noise signal is superimposed on the information signal by the transmitter equipment. The receiver then removes the pseudorandom noise before processing the information signal. In order to remove the particular pseudorandom noise signal superimposed on the received signal, the receiver must in some way be synchronized to the transmitter.

For synchronization, it is necessary to determine the time of arrival of a burst as well as its frequency. A PN synchronization ("sync") preamble is employed at the beginning of a data burst as a system overhead dedicated to the synchronization process. This is indicated in graphical form in FIG. 1. The pattern of the sync preamble is known a priori to both the transmitter and receiver. A sync preamble correlation detector is typically employed at the receiver to detect the sync preamble. It is necessary that the correlation detector be able to operate in the presence of frequency error.

Reliable data detection requires the frequency error to be small. For phase-modulated data symbols, large frequency errors or offsets disturb the signal and make reliable data detection virtually impossible. The frequency error or offset is the difference between the transmitting and receiving frequencies and may be caused by a number of factors, including doppler shift or receiver or transmitter oscillator frequency shift.

To accommodate large frequency errors, the conventional sync preamble correlation detection circuitry performs both linear (pre-detection) and non-linear (post-detection) integration of the products of the received preamble bits or chips with the reference preamble. Also, to shorten the length of the preamble required, the conventional design employs a technique whereby the linear integration time is such that the resultant output signal phase either advances or retards 90° from one subcorrelator to the next. The subcorrelator is the circuit by which correlation and linear integration are performed. The conventional design sets the linear integration time to $\frac{1}{4}F$ seconds, where F denotes the maximum frequency offset or error expected.

When improvement on the signal-to-noise ratio (SNR) resulting from the $\frac{1}{4}F$ second linear integration is insufficient to support a desired probability of detection at a desired false alarm rate, the conventional design then applies the non-linear integration to further improve the SNR. Since, as is well known, the non-linear integration is less efficient in improving the SNR than linear integration, a frequency search approach is sometimes employed to extend the linear integration time beyond the $\frac{1}{4}F$ seconds, so that the number of non-linear integration operations can be reduced. Such a search may be executed either in a serial or parallel manner. While the implementation of the serial search requires minimal hardware, it may consume a preamble acquisition time longer than allowed. On the other hand, implementation of a parallel search requires using multiple frequency sensitive circuits for simultaneously examining the subbands of the frequency uncertainty window. However, size, weight and cost considerations often forbid the use of the preamble correlation detector having a parallel searching feature.

A known technique for obtaining the frequency offset estimate from the subcorrelator outputs involves computation of the phase changes between adjacent pairs of subcorrelator outputs. However, this frequency estimation technique has not been found to significantly improve the performance of the sync preamble correlation detection.

It is therefore an object of the present invention to provide a preamble correlation detector having a parallel searching feature at relatively low cost.

Another object of the invention is to provide a device which simultaneously performs sync preamble correlation detection and frequency offset estimation functions.

A further object of the invention is to provide a correlator processor adapted for linear reintegration of subcorrelator outputs in a highly efficient manner.

Another object is to provide a PN preamble correlation detector requiring a reduced signal-to-noise ratio threshold for detecting the arrival of th PN sequence.

SUMMARY OF THE INVENTION

A device is disclosed which simultaneously performs sync preamble correlation detection and frequency offset estimation functions for a spread spectrum communication system receiver. The device detects the arrival of the psuedonoise (PN) sequence used by the system and synchronizes the receiver to that sequence. The frequency offset estimate obtained by the device allows the receiver to rapidly achieve a coarse frequency synchronization with the incoming signal frequency. The invention reduces the signal-to-noise ratio threshold for detecting the arrival of the PN sequence, and allows an estimate of the signal frequency to be rapidly obtained. The size, weight and cost of the circuitry are minimized, and the device can be fabricated as a single large scale integrated circuit.

The preferred embodiment of the invention comprises a parallel frequency search technique executed by a number of frequency sensitive circuit channels connected in parallel. The parallel circuit channels first apply phase corrections to the subcorrelator outputs, and then linearly re-integrate the modifier outputs. In each reintegration channel, the phase corrections applied to the subcorrelator outputs vary with the frequency offset subband to which the channel is designed to match. By applying 0°, 90°, 180° or 270° in lieu of the phase corrections exactly required to compensate for the frequency offset, the novel re-integration technique eliminates the need for multiplication operations, and also the need for storing a large number of weighting coefficients. As a result, the reintegration process only involves addition and subtraction operations, and the non-linear integration process is completely eliminated. The detector also establishes an estimate of the input signal frequency at the time of detection of the preamble correlation by determining which frequency sensitive channel output is largest.

BRIEF DESCRIPTION OF THE DRAWINGS

These and other features, object, and advantages of the present invention will become more apparent from the following detailed description of an exemplary embodiment thereof, as illustrated in the accompanying drawings, in which:

FIG. 5 is a graph plotting the loss of output power for a reintegration channel as a function of phase mismatch for several contributing factors.

FIG. 6 is a graph illustrating the reintegration loss of a nine-channel correlator circuit in accordance with the invention.

DETAILED DESCRIPTION OF THE PREFERRED EMBODIMENTS

The following description is presented in the context of a particular application and its requirements. Various modifications to the preferred embodiment may be apparent to those skilled in the art, and the generic principles defined herein may be applied to other embodiments and applications. The present invention is not intended to be limited to the embodiment shown, but is intended to be accorded the widest scope consistent with the principles and features disclosed herein.

Figure 1:
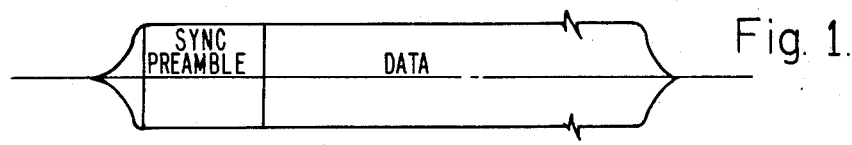
FIG. 1 is a signal diagram depicting the sync preamble sequence in relation to the data sequence.
Figure 2:
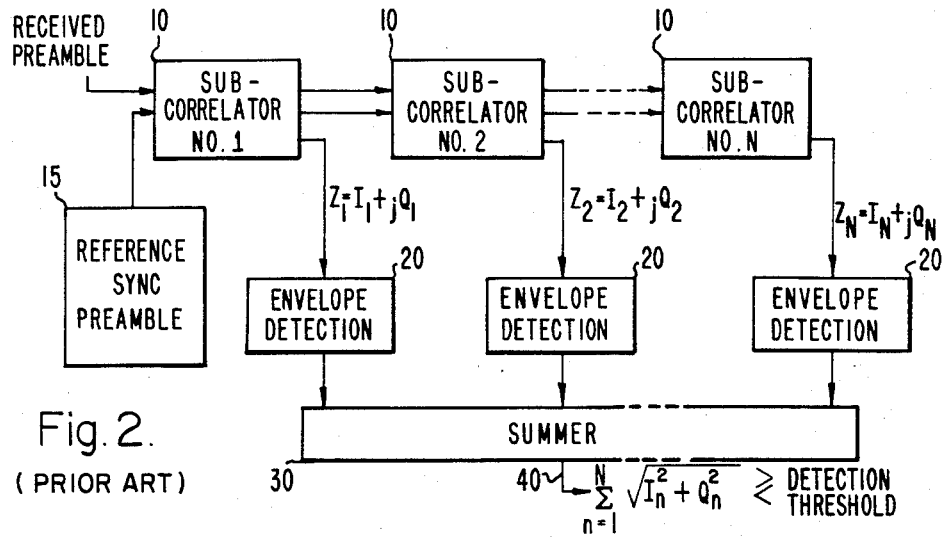
FIG. 2 is a block diagram of a conventional sync preamble correlation detector.

A simplified diagram of the conventional sync preamble correlation circuitry is shown in FIG. 2. N subcorrelators 10 correlate the received signal with the stored sync preamble replica reference 15 of length $NT_s/T_c$ chips, where $T_s$ denotes the subcorrelator linear integration time and $T_c$ denotes the chip duration. With A denoting the amplitude of the received signal having a frequency offset f Hz, and assuming that preamble correlation has been achieved, the first subcorrelator complex output $z_1$ can be written as $$z_1 = z_0 e^{j\phi_o} \tag{1}$$

where $\phi_o$ denotes an arbitrary phase reference, and $z_o$ is given by $$z_o = A \frac{T_s \sin(\pi f T_s)}{T_c (\pi f T_s)} \tag{2}$$

in which the sync function reflects the subcorrelator integration loss. With $\phi = 2\pi f T_s$, the Nth subcorrelator output $z_N$ can be written in terms of $z_1$ as $$z_N = z_1 e^{j(n-1)\phi} \Delta I_n + jQ_n, \tag{3}$$

where $I_n$ and $Q_n$ are the inphase and quadrature components of the Nth subcorrelator output. Each subcorrelator output signal is indicative of the extent of matching between predetermined chips of the reference and data signal. Correlator devices to accomplish this function are well known in the art, for example, the CMOS correlator produced by Hughes Aircraft Company, Newport Beach, Calif., as part number 72700-2, and are not described in further detail.

Figure 3A:
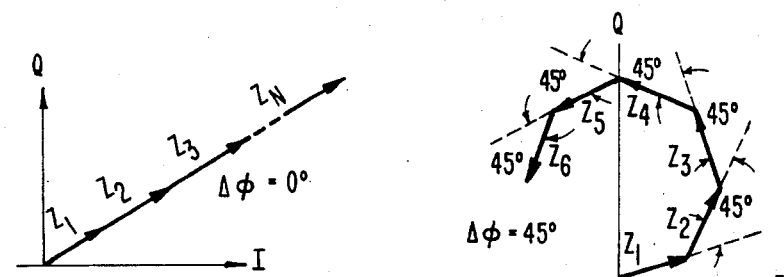
FIGS. 3a–3c illustrate in graph form the effect of phase changes on the integration of the subcorrelator outputs.
Figure 3B:
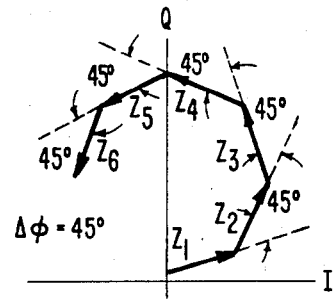

The complex outputs $z_N$ of the subcorrelator circuits are illustrated in graph form in FIGS. 3a and 3b, where the in-phase component I of $z_N$ is plotted along the horizontal axis and the quadrature component along the vertical axis.

It is noted that a frequency offset or error of $\Delta F$ Hz causes a phase shift $\Delta\phi = 2\pi\Delta FT$ radians per subcorrelator. If the frequency error is zero, then the phase shift is also zero and the outputs $z_N$ may be coherently combined, as illustrated in FIG. 3a. If the frequency error is not zero, then the outputs do not add coherently. This is graphically illustrated in FIG. 3b for an assumed $\Delta\phi = 45°$.

The conventional design may include non-linear post-detection as illustrated in FIG. 2 to eliminate the influence of the phase shifts and allow accumulation of signal energies from each subcorrelator. This is performed in an envelope detection operation 20 which is performed on each subcorrelator output $z_N$, resulting in a signal proportional to the sum of the squares of the real and imaginary components of $z_N$, i.e., $I^2_n + Q^2_n$. The summer 30 then performs a summation operation of the signals resulting from the envelope detection operations. The summed energy on line 40 is then compared with a detection threshold to determine whether the preamble has been detected. This post-detection non-linear integration is less effective in improving the required signal-to-noise ratio (SNR), requiring longer sync preambles and more subcorrelators to accomplish a desired SNR improvement.

Figure 3C:
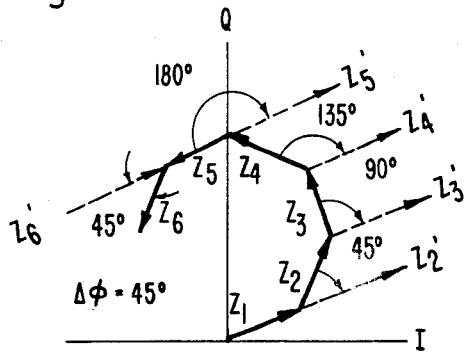

In the preferred embodiment of the invention, the non-linear envelope detection operation is replaced by a phase shift operation. This allows the phase-adjusted subcorrelator outputs to be linearly combined. If a phase correction $-\phi, -2\phi, -3\phi, \ldots -(N-1)\phi$ is applied to the outputs of the second, third, fourth, ... N subcorrelators, respectively, the progressive phase shifts due to the frequency offset are removed and N complex signals of the same phase angle are thereby obtained. This is illustrated in FIG. 3c for an assumed $\Delta\phi = 45°$. Addition of N such signals will effectively extend the linear integration time beyond the $T_s$ second time duration. It is noted that this operation does not recover the subcorrelator integration loss. With $T_s$ equivalent to ¼F, the maximum loss is 0.91 dB, occurring when the actual frequency offset turns out to be the maximum offset expected.

Figure 4:
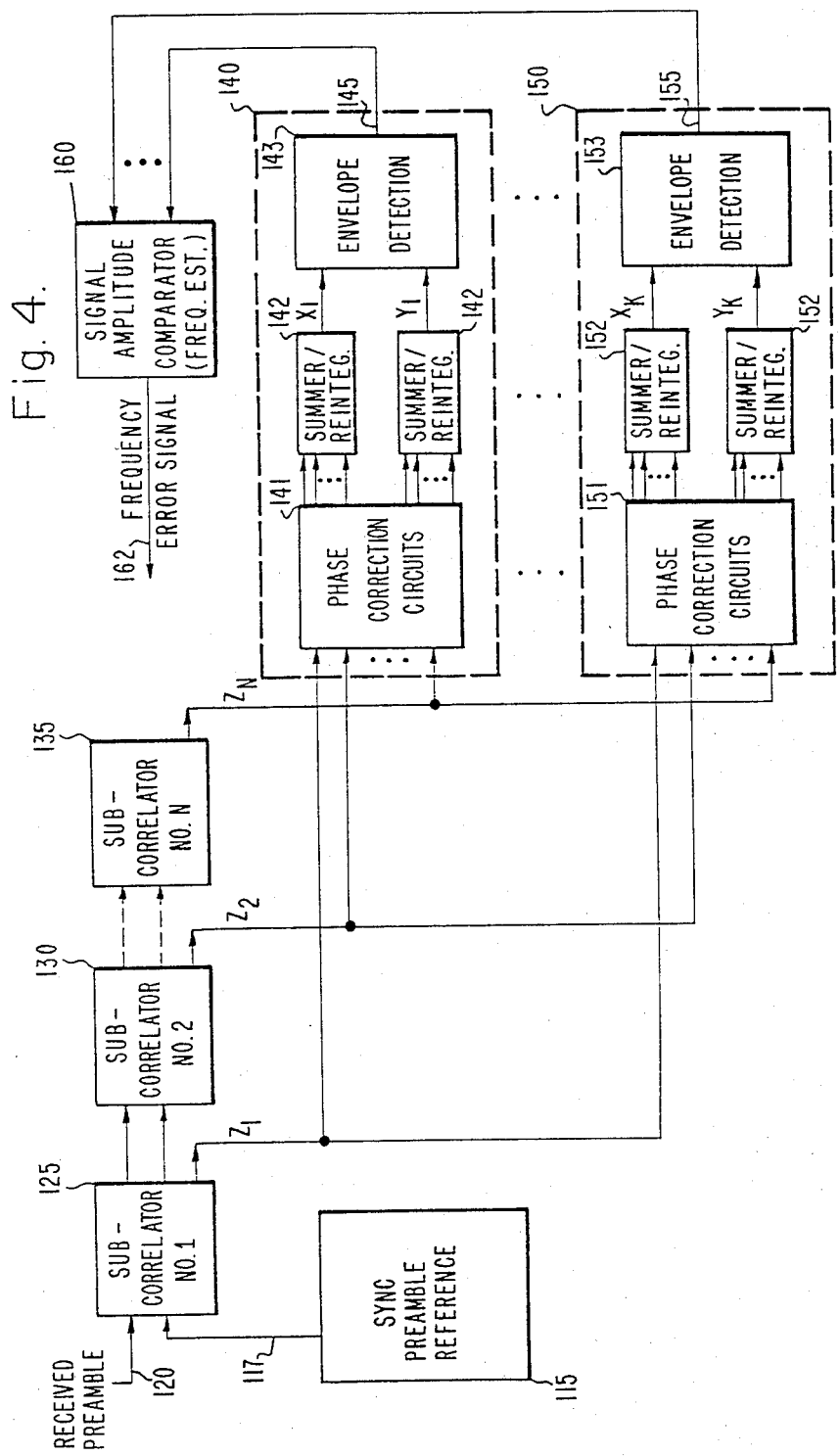
FIG. 4 is a block diagram of a parallel search, sync preamble correlation detector and frequency estimator in accordance with the invention.

Unlike the conventional preamble correlation detector which combines the subcorrelator outputs non-linearly, the subcorrelator outputs in the device shown in FIG. 4 are processed by a plurality (K) of frequency sensitive circuits, which perform phase corrections and linear combining of the phase-modified subcorrelator outputs. The received preamble is provided to subcorrelator No. 1 via line 120, together with the stored sync preamble reference via line 117. The received preamble and reference preamble are also provided to the successive subcorrelators 130,135, as depicted in FIG. 4.

The subcorrelator outputs $z_1 \ldots z_N$ are coupled to the phase correction circuits 141,151 and the corrected outputs are summed (linearly reintegrated) in summer/reintegraters 142,152 to provide the complex values $X_1, Y_1 \ldots X_K, Y_K$ which are respectively passed through the envelope detection circuits 143,153 to provide the respective channel outputs 145,155 for channels 140,150 respectively.

Lacking knowledge of the actual frequency offset, the structure diagrammed in FIG. 4 assumes the offset to be one of the K values; $\hat{f}_1, \hat{f}_2, \ldots$ or $\hat{f}_k$. Each processing channel is then tuned to, or centered at, a respective one of the assumed offsets $f_k$. The phase correction circuits in the kth circuit channel first shift the Nth subcorrelator output by $-(n-1)\hat{\phi}_k$ radians, where $$\hat{\phi}_k = 2\pi \hat{f}_k T_s \qquad (4)$$

and afterward linearly combines the weighted outputs to generate the channel output. The inphase component $X_k$ and the quadrature component $Y_k$ of the kth channel output are formed as shown in Equation 5.

$$X_k + jY_k = \sum_{n=1}^{N} z_n e^{-j(n-1)\hat{\phi}_k} \qquad (5)$$

In terms of the inphase and quadrature components of the subcorrelator outputs, the channel outputs $X_k$ and $Y_k$ can be expressed as $$\begin{vmatrix} X_k \\ Y_k \end{vmatrix} = \sum_{n=1}^{N} \begin{bmatrix} \cos(n-1)\hat{\phi}_k & \sin(n-1)\hat{\phi}_k \\ -\sin(n-1)\hat{\phi}_k & \cos(n-1)\hat{\phi}_k \end{bmatrix} \begin{vmatrix} I_n \\ Q_n \end{vmatrix} \qquad (6)$$

where $k = 1, 2, \ldots, K$. When the actual frequency offset happens to match the assumed value $f_k$, the N subcorrelator outputs will be summed (linearly reintegrated) in the coherent manner to yield $X_k$ and $Y_k$. Otherwise, phase mismatches reduce the degree of coherency, and consequently introduce linear reintegration (addition) losses. The magnitude of the output of the kth channel is given by $$|X_k + jY_k| = A \frac{T_s}{T_c} \cdot \frac{\sin(\pi f T_s)}{(\pi f T_s)} \cdot \frac{\sin\left(N \frac{\phi - \hat{\phi}_k}{2}\right)}{\sin\left(\frac{\phi - \hat{\phi}_k}{2}\right)} \qquad (7)$$

The reintegration loss is the the factor given in (8)

$$\frac{\sin\left(N \frac{\phi - \hat{\phi}_k}{2}\right)}{N \sin\left(\frac{\phi - \hat{\phi}_k}{2}\right)} \qquad (8)$$

as a function of the phase shift mismatch (i.e., $\phi - \hat{\phi}_k$ which is equal to $2\pi(f - \hat{f}_k)T_s$ with $N = 20$ in this example. FIG. 5 plots the power loss (dB) as a function of the phase mismatch for the factor given in (8), as well as to other factors, for the example in which twenty subcorrelators are employed (N=20). It is seen in FIG. 5 that the frequency range over which a channel is capable of achieving a low reintegration loss is quite limited. For this reason, a large number of channels must be utilized to cover the frequency uncertainty window to ensure the realization of a near-coherent integration from at least one of the channels. When matched, the reintegration process extends the linear integration times by a factor of N times that employed by the subcorrelator.

The magnitude of the channel output $X_k + jY_k$ varies with the difference between the actual and assumed frequency offset $\hat{f}_k$. The largest output will be obtained from the channel whose center frequency deviates least from the actual frequency offset. It is this property that allows the selection of the center frequency of that channel yielding the largest output as the maximum likelihood estimate of the actual frequency offset to this end, channel outputs 145,153 are provided to signal amplitude computer 160 (FIG. 4) in which the signal amplitudes of all k channels 140,150 are compared to determine the highest signal, the frequency associated with the channel having the highest output signal is estimated as the input signal frequency. A signal corresponding to such channel frequency in output at 162 for use by the associated spread spectrum receiver. Signal amplitudes comparator 160 may thus be considered as frequency or frequency errors estimating means.

The computations indicated in Equation 6 involve 4KN multiplications and 2KN additions. Also, 4KN values of sine and cosine functions need to be stored. In view of the need for large number of channels and of the high chip rate often encountered, straightforward implementation of the phase correction circuits for sync correlation detector and frequency estimator (SPCDFE) in the manner as specified in Equation 6 will necessarily result in relatively complicated and costly circuitry.

One aspect of the invention comprises a simplified and practical implementation of the SPCDFE shown in FIG. 4. In this implementation, the phase corrections applied to remove the progressive phase shifts caused by the frequency offset are approximated values. Specifically, the exact correction required on a subcorrelator output is substituted by 0°, 90°, 180° or 270°, whichever is nearest to the exact correction required to completely remove a phase shift. While it has the worst case approximation error of 45° and rms error of 13°, this approximation rule drastically reduces the computation burden because the sine and cosine functions employed in Equation 6 reduce to either 1, 0 or −1. As a result, the approximation rule completely eliminates the storage needs and, more significantly, allows replacement of the phase rotation computation by one of the four operations specified in (9) below.

(a) Do not modify the subcorrelator output $I_n + jQ_n$ (9)

(b) Replace $I_n + jQ_n$ by $-I_n - jQ_n$ (c) Replace $I_n + jQ_n$ by $-Q_n + jI_n$ (d) Replace $I_n + jQ_n$ by $+Q_n - jI_n$ As demonstrated in (9) the phase correction, reintegration operation performed by each channel now only involves addition and subtraction operations, for example, in summer/reintegraters 142/152 (FIG. 4).

The simplicity of the reintegration operation is illustrated with a nine-channel example. Consider a PN spread spectrum communication system specified to be operated in a worst case frequency offset of $F = \pm 39$ kHz, using a 10 MHz sync preamble with length of 1280 chips. In the conventional preamble correlation detector design, the subcorrelator integration time will be $\frac{1}{4}F = 6.4$ μsec (64 chip durations), and the number of post detection combinations will be 20. When operated in the absence of a frequency offset and with the carrier-to-noise-power density ($C/N_o$) ratio at the detector input being 55.1 dB-Hz, the design supports a 0.9 probability of detection rate and a $10^{-6}$ false alarm rate. In the presence of an offset of $\pm 39$ kHz, the subcorrelator integration suffers a loss of 0.91 dB. Hence, the same performance would be obtained provided $C/N_O = 56$ dB-Hz.

A sync preamble correlation detector in accordance with the invention involves the elimination of the non-linear combining circuitry and the use of the reintegration technique. The technique is illustrated with a design example consisting of nine uniformly spaced channels with $2F/9$ Hz as the channel separation and 20 subcorrelators. The frequency offset to which the kth channel is adapted to match is $(2(k-1)-8)F/9$ Hz, where $k = 1, 2, \ldots 9$. This corresponds to matching $20(k-1) - 80$ degrees of phase shift per subcorrelator.

The approximated phase corrections applied to the subcorrelator outputs for all nine channels are tabulated in Table 1, where the notations $1, -1, J$ and $-J$ denote the operations (a), (b), (c), and (d) respectively specified in (9) above.

TABLE 1

| Subcorrelator Output | Phase Correction Applied to kth Subcorrelator Output ||||||||| 
|---|---|---|---|---|---|---|---|---|---|
| | CH1 | CH2 | CH3 | CH4 | CH5 | CH6 | CH7 | CH8 | CH9 |
| $z_1$ | 1 | 1 | 1 | 1 | 1 | 1 | 1 | 1 | 1 |
| $z_2$ | J | J | 1 | 1 | 1 | 1 | 1 | −J | −J |
| $z_3$ | −1 | J | J | 1 | 1 | 1 | −J | −J | −1 |
| $z_4$ | −J | −1 | J | J | 1 | −J | −J | −1 | J |
| $z_5$ | 1 | −J | −1 | J | 1 | −J | −1 | J | 1 |
| $z_6$ | 1 | −J | −1 | J | 1 | −J | −1 | J | 1 |
| $z_7$ | J | 1 | −J | J | 1 | −J | J | 1 | −J |
| $z_8$ | −1 | J | −J | −1 | 1 | −1 | J | −J | −1 |
| $z_9$ | −J | J | 1 | −1 | 1 | −1 | 1 | −J | J |
| $z_{10}$ | 1 | −1 | 1 | −1 | 1 | −1 | 1 | −1 | 1 |
| $z_{11}$ | J | −J | 1 | −1 | 1 | −1 | 1 | J | −J |
| $z_{12}$ | −1 | −J | J | −1 | 1 | −1 | −J | J | −1 |
| $z_{13}$ | −J | 1 | J | −J | 1 | J | −J | 1 | J |
| $z_{14}$ | 1 | J | −1 | −J | 1 | −1 | −J | −1 | 1 |
| $z_{15}$ | 1 | J | −1 | −J | 1 | −1 | J | −J | 1 |
| $z_{16}$ | J | −1 | −J | −J | 1 | J | J | −1 | −J |
| $z_{17}$ | −1 | −J | −J | 1 | 1 | 1 | J | J | −1 |
| $z_{18}$ | −J | −J | 1 | 1 | 1 | 1 | 1 | J | J |
| $z_{19}$ | 1 | 1 | 1 | 1 | 1 | 1 | 1 | 1 | 1 |
| $z_{20}$ | J | J | 1 | 1 | 1 | 1 | 1 | −J | −J |

To illustrate how Table 1 relates to the manner in which the subcorrelator outputs are processed, operations performed by the second, the fourth and the fifth channel to generate the inphase component $X_k$ and quadrature component $Y_k$ of the channel output are given below.

Channel 2 (designed to match $-6F/9$ Hz offset):

$$X_2 = I_1 - Q_2 - Q_3 - I_4 + Q_5 + Q_6 + I_7 - Q_8 - Q_9 - I_{10} + Q_{11} + Q_{12} + I_{13} - Q_{14} - Q_{15} - I_{16} + Q_{17} + Q_{18} + I_{19} - Q_{20} \quad (10)$$

$$Y_2 = Q_1 + I_2 + I_3 - Q_4 - I_5 - I_6 + Q_7 + I_8 + I_9 - Q_{10} - I_{11} - I_{12} + Q_{13} + I_{14} + I_{15} - Q_{16} - I_{17} - I_{18} + Q_{19} + I_{20} \quad (11)$$

Channel 4 (designed to match $-2F/9$ Hz offset):

$$X_4 = I_1 + I_2 + I_3 - Q_4 - Q_5 - Q_6 - Q_7 - I_8 - I_9 - I_{10} - I_{11} - I_{12} + Q_{13} + Q_{14} + Q_{15} + Q_{16} + I_{17} + I_{18} + I_{19} + I_{20} \quad (12)$$

$$Y_4 = Q_1 + Q_2 + Q_3 + I_4 + I_5 + I_6 + I_7 - Q_8 - Q_9 - Q_{10} - Q_{11} - Q_{12} - I_{13} - I_{14} - I_{15} - I_{16} + Q_{17} + Q_{18} + Q_{19} + Q_{20} \quad (13)$$

Channel 5 (to match 0 Hz offset):

$$X_5 = \sum_{n=1}^{20} I_n \quad (14)$$

$$Y_5 = \sum_{n=1}^{20} Q_n \quad (15)$$

If the communications system was specified to operate at zero frequency offset, the preamble correlation detector could be designed on the basis of linear integration alone, and the linear integration time could be extended to the entire preamble duration. Under this circumstance, it may be readily verified that such a detector would achieve the same detection and false alarm rates with $C/N_o = 52.8$ dB-Hz, which is 2.9 dB lower than that required by the conventional design described earlier. This implies that, in terms of achieving the same performance, the 9-channel SPCDFE of the invention may at most have 2.9 dB advantage over the conventional detector design. With this background, the reintegration performance of the nine-channel design is described next.

A perfect reintegration produces a channel output 20 times greater than the subcorrelator output voltage level (13 dB power gain). Because this embodiment of the invention employs approximations, attempts to match only nine possible frequency offsets, and does not recover the subcorrelator integration losses, the nine-channel SPCDFE performance turns out to be worse than desired, as can be seen from the reintegration power loss curves shown in FIG. 6. Because the 5th channel is designed to match zero frequency offset and requires no phase corrections at all, there is on reintegration loss at the center frequency of this channel. All other channels suffer roughly 0.8 dB loss at their center frequencies. This is the price paid for the simplified implementation technique. (These curves do not include the subcorrelator integration loss. The reintegration losses associated with the 6th, 7th, 8th and 9th channels are the mirror images of the 4th, 3rd, 2nd and 1st channels, respectively, and are omitted from FIG. 6.)

Even though the reintegration circuits provide the frequency estimation capability not found in the conventional design, the performance of this particular design from the preamble correlation viewpoint may not be attractive for many applications. This is because the loss exceeds 2.9 dB over some frequency regions wherein the mismatch between the assumed frequency offset and the received signal causes greater than roughly 7° phase mismatch. To realize a performance comparable to that of the conventional design in those regions, more channels will have to be incorporated. The needed phase corrections for the additional channels can be established in the same manner as the nine existing channels. However, in order to minimize the number of added circuit components used by the additional channel, another novel technique is employed.

The invention further comprises a novel technique for incorporating more reintegration channels into the SPCDFE design without significantly increasing the number of circuit components. The technique again involves the use of approximations. To simplify the analysis for clarity of description, it is assumed that the nine existing channels were implemented without relying on the approximation rule, that is, implemented in accordance with Equation 6.

Referring to Equation 5, if the series is partitioned into two parts and the first and second N/2 terms (here n=20) are combined separately, the series reduces to the sum of two phasors of the same magnitude but, in general, of unequal angles. Denoting the sum of the first N/2 terms and the sum of the second N/2 terms as $P_1$ and $P_2$, respectively, $$P_1 = z_1 \frac{\sin\left(\frac{N}{2} \frac{\phi - \hat{\phi}_k}{2}\right)}{\sin\left(\frac{\phi - \hat{\phi}_k}{2}\right)} e^{j(\frac{N}{2}-1)(\frac{\phi-\hat{\phi}_k}{2})} \quad (16)$$

and $$P_2 = P_1 e^{j\frac{N}{2}(\phi - \hat{\phi}_k)}$$

When the assumed phase shift $\hat{\phi}_k$ matches the actual shift $\phi$, the partial sums $P_1$ and $P_2$ become in phase. Also, the $$\sin\left(\frac{N}{2} \frac{\phi - \hat{\phi}_k}{2}\right) / \sin\left(\frac{\phi - \hat{\phi}_k}{2}\right) \quad (16a)$$

factor equals N/2, which in turn maximizes $P_1$. When $\hat{\phi}_k$ and $\phi$ are not equal, the existence of the phase difference between $P_1$ and $P_2$ not only decreases the magnitude of this factor, but also reduces the magnitude of the sum ($P_1+P_2$). In terms of $P_1$, the kth channel complex output can be rewritten as $$P_1 + P_2 = 2P_1 \cos\left|\frac{N}{4}(\phi - \hat{\phi}_k)\right| e^{j\frac{N}{4}(\phi-\hat{\phi}_k)} \quad (17)$$

which indicates that the phase difference between the partial sums affects the magnitude of the channel output in accordance with $\cos[N(\phi-\hat{\phi}_k)/4]$.

FIG. 5 shows the loss of the output power of the kth reintegration channel for $\phi-\hat{\phi}_k$ between 0° and 10°, along with losses associated with the contributing components. The phase difference $N(\phi-\hat{\phi}_k)/2$ between the partial sums causes much greater loss than the factor of (16a). For instance, given that the frequency offset mismatch causes a 6.5° phase mismatch, the loss due to the former reaches 1.48 dB while that attributed to the latter is only 0.46 dB. With $\phi-\hat{\phi}_k=10°$, the difference in losses between these two components exceeds 2.7 dB.

It is noted that the curves shown in FIG. 5 are also valid for the other channels. Let f' be a frequency in the neighborhood of the assumed offset $f_k$, and $\phi'$ be the corresponding phase shift across a subcorrelator, i.e., $\phi'=2\pi f'T_s$. If a phase correction in the amount of $-N(\phi'-\hat{\phi}_k)/2$ is applied to the sum of the second N/2 subcorrelator outputs and the resultant $P_2 e^{-jN(\phi'-\hat{\phi}_k)/2}$ is added to the sum of the first N/2 subcorrelator outputs, the two partial sums are then coherently combined. Just as the reintegration process specified by Equation 6 fails to eliminate the subcorrelator integration loss, this combining technique does not completely recover the loss due to the phase mismatch either. However, as compared with directly adding $P_1$ to $P_2$, this technique does eliminate the loss resulted from the phase difference between $P_1$ and $P_2$, which as just illustrated is the dominant loss contributor. A linear reintegration channel created in this manner only needs one extra phase shifter compared with N−1 shifters by a channel constructed according to Equation 6.

This technique, which allows one to trade a slightly degraded reintegration performance for size, weight and cost reduction, is used to create the additional channels from the exemplary 9-channel design described above. The channels formed in this manner will be referred to as the derivative channels, while those employing (n−1) phase shifters the primary channels.

The foregoing analysis and conclusion are based upon the assumption that the primary channels exactly correct the phases of the subcorrelator outputs. Using 0°, 90°, 180° and 270° in lieu of the exact correction values yield higher reintegration losses, but the technique remains applicable. To keep the loss low, the derivative channel is preferably centered at a frequency no greater than 1.5F/N(=0.075F Hz, for N=20) away from the nearest primary channel center. This sets the theoretical phase difference between the partial sums at the derivative channel center frequency as no greater than 67.5° when N=20.

As an example of the technique of creating a derivative channel, the exemplary nine channel design is expanded into 27 channels. The expansion is achieved by creating two derivative channels from one primary channel. Thus, this circuit comprises 9 primary and 18 derivative channels, with the latter centered at either 2F/27 Hz or −2F/27 Hz away from the nearest primary channel. With the channel spacing reduced to 2F/27 Hz, this particular design limits the maximum possible phase mismatch to be no greater than π/54 radians (3.3°).

The two derivative channels associated with the fourth primary channel are singled out to illustrate the technique of forming derivative channels from a primary channel. The fourth primary channel is designated to match a frequency offset of −2F/9 Hz, or equivalently an offset to cause −20° phase shift across a subcorrelator (Equations 12 and 13). The inphase and quadrature components of the fourth channel output can be rewritten as $$X_4 = X_{4a} + X_{4b} \quad (18)$$

$$Y_4 = Y_{4a} + Y_{4b} \quad (19)$$

where $$X_{4a} = I_1 + I_2 + I_3 - Q_4 - Q_5 - Q_6 - Q_7 - I_8 - I_9 - I_{10}$$

$$X_{4b} = -I_{11} - I_{12} + Q_{13} + Q_{14} + Q_{15} + Q_{16} + I_{17} + I_{18} + I_{19} + I_{20}$$

$$Y_{4a} = Q_1 + Q_2 + Q_3 + I_4 + I_5 + I_6 + I_7 - Q_8 - Q_9 - Q_{10}$$

and $$Y_{4b} = -Q_{11} - Q_{12} - I_{13} - I_{14} - I_{15} - I_{16} + Q_{17} + Q_{18} + Q_{19} + Q_{20}$$

The terms $X_{4a} + jY_{4a}$ and $X_{4b} + jY_{4b}$ represent the sum of the first ten and second ten subcorrelator outputs, respectively. Theoretically, the phase difference between $P_1$ and $P_2$ is equal to $N(\phi - \phi_k)/2 = \pm 66°$ at the frequency $\pm 2F/27$ kHz away from the channel center frequency $-2F/9$ Hz. Because the phase corrections applied to form $X_4$ and $Y_4$ are the approximated values, the actual phase difference is 68° when the offset is $-8F/27$ Hz and, $-64.8°$ when the offset is $-4F/27$ Hz. Since the allowed correction nearest to 68° is 90° and that nearest $-64.8°$ is $-90°$, 90° and $-90°$ phase corrections are applied to the sum of the second ten subcorrelator complex outputs to form the two derivative channels. Let $X_4'$ and $Y_4'$ be the inphase and quadrature components of the output of the derivative channel centered at $-4F/27$ Hz. The computations performed to obtain these two components can be expressed in terms of $X_{4a}$, $X_{4b}$, $Y_{4a}$, and $Y_{4b}$.

$$X_4' = X_{4a} - Y_{4b} \quad (20)$$

$$Y_4' = Y_{4a} + X_{4b} \quad (21)$$

The counterparts for the derivative channel centered at $-8F/27$ Hz are formed in the following manner:

$$X_4'' = X_{4a} + Y_{4b} \quad (22)$$

$$Y_4'' = Y_{4a} - X_{4b} \quad (23)$$

The phase differences between the sums of the first and second ten subcorrelator outputs at $\pm 2F/27$ Hz away from the center frequency of each of the remaining eight primary channels lie between 63.4° and 69.2°, or between $-62.4°$ and $-69°$. As a result, the other 16 derivative channels are formed by applying the same amount of phase correction (i.e., either 90° or $-90°$) to the sum of the second ten subcorrelator outputs. The equations showing the reintegration performed by those derivative channels are thus omitted.

The reintegration operation performed by a derivative channel generally suffers higher loss than the primary channel. This is mainly due to the fact that the phase correction applied to the sum of the second ten subcorrelator outputs is an approximated value. However, as illustrated by examining (18) through (23), the derivative channels are formed with very few extra circuit components.

Figure 7:
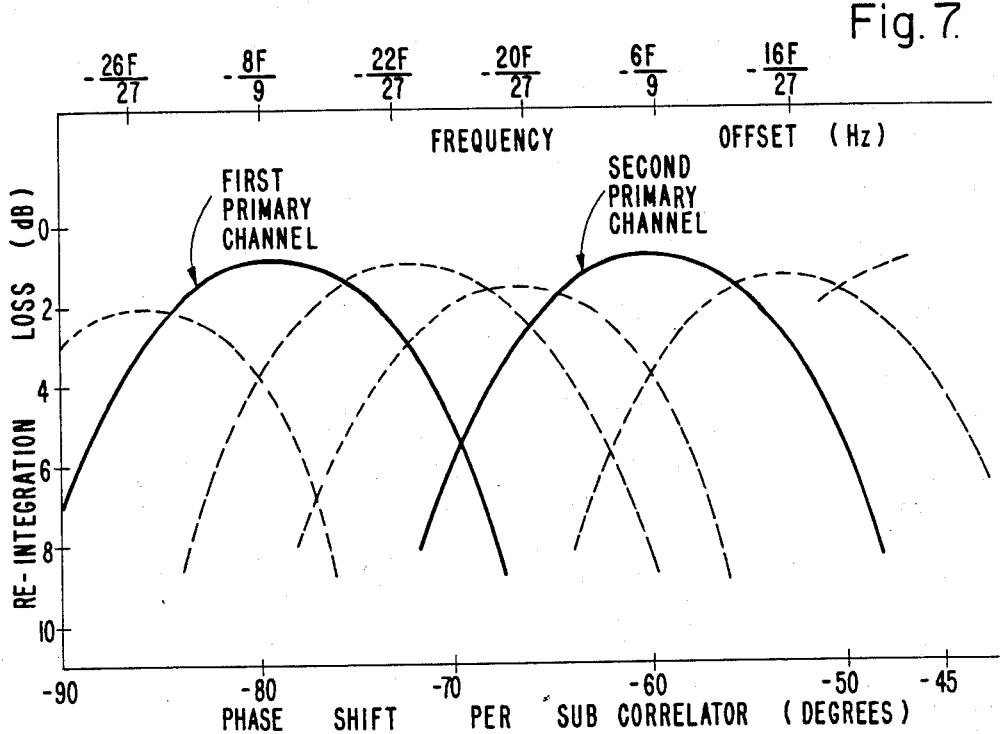
FIGS. 7, 8 and 9 are graphs respectively illustrating the reintegration losses of derivative channels associated with the first and second, the third and fourth, and the fourth and fifth primary channels of a correlator circuit in accordance with the invention.
Figure 8:
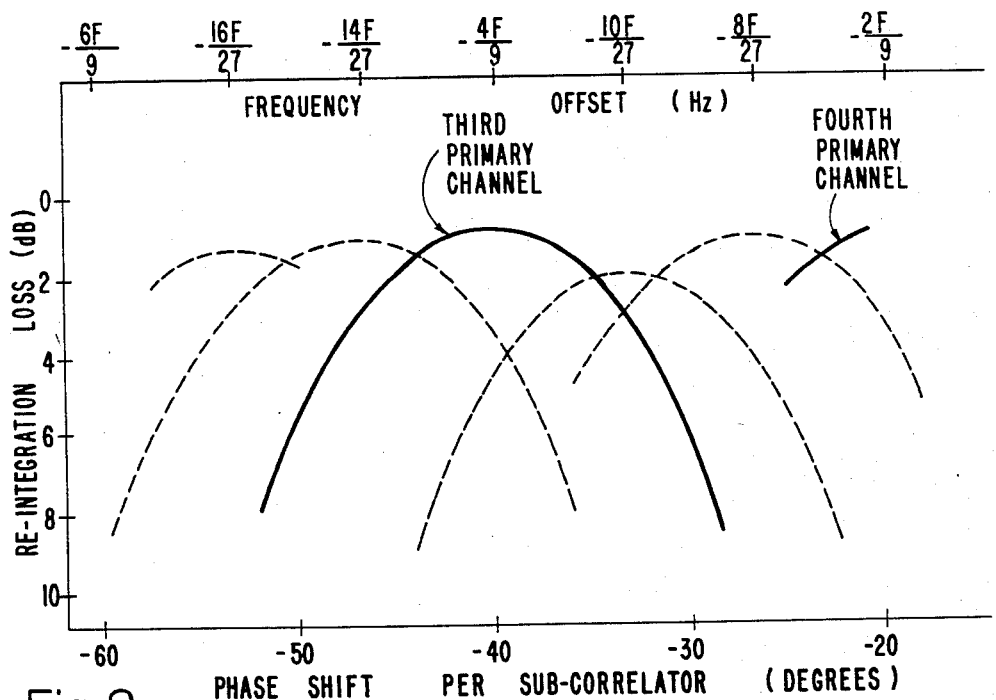
Figure 9:
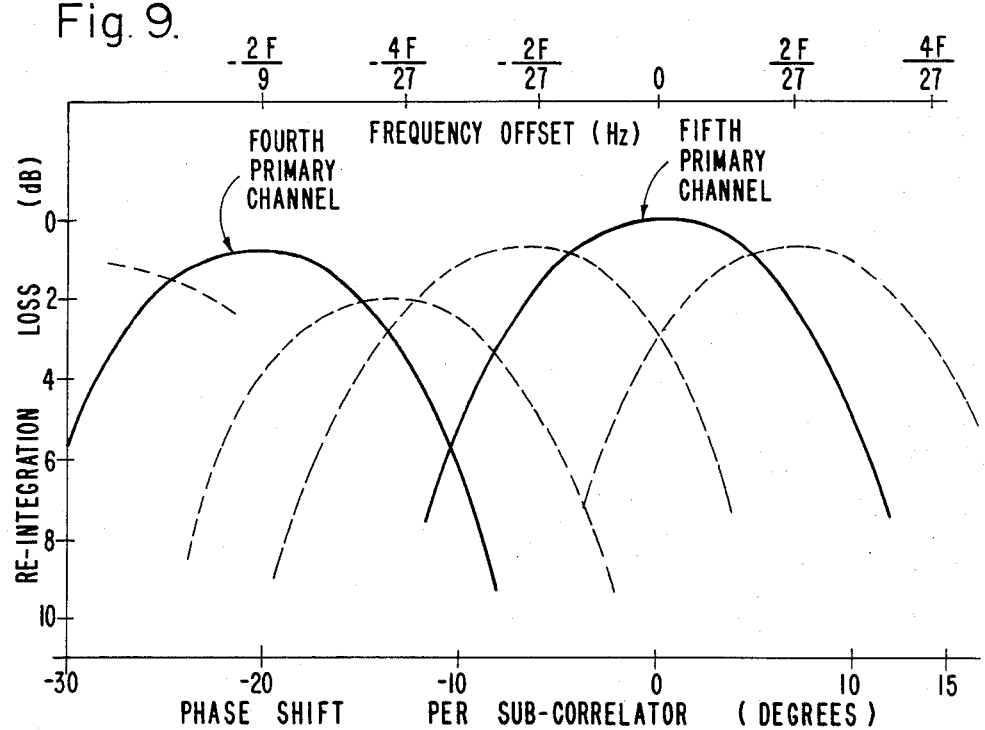

FIG. 7 illustrates losses of the derivative channels associated with the first and second primary integration channels. Similar losses associated with the third through fifth primary channels are shown in FIGS. 8 and 9. Like the curves shown in FIG. 6, these curves again exclude the subcorrelator integration loss. Ideally, each of the 27 channels should have the same amount of useful frequency width, namely, $2F/27$ Hz.

Because of using approximations, the reintegration loss at a frequency less than $F/27$ Hz away from the center of same channel may exceed the loss of the adjacent channel at the same frequency, as shown in FIG. 8. For instance, the loss at $F/27$ on the left of the center of the channel centered at $-10 F/27$ Hz is found to be 2.4 dB. Its adjacent channel (the third primary channel) at the same frequency, however, has only a loss of 1.5 dB. In this case, the loss from a correlation detection viewpoint is actually 1.5 dB rather than 2.4 dB. On the basis of a determination of which channel has the largest output, this phenomenon will cause the frequency estimation error to be slightly higher than one-half of the channel spacing.

Except in the region near the highest expected frequency offset, the losses of both the primary and derivative channels are between 0 dB and 2.1 dB. Thus, the 27-channel design supports the same detection and false alarm rate performance at a $C/N_o$ ratio which is 0.8 dB to 2.9 dB lower than the conventional correlation detector design described earlier with respect to FIG. 3. Perhaps more signficantly, the design provides a frequency estimation capability not obtainable from the conventional design. Choosing the frequency offset estimate on the basis of which channel yields the largest output, the 27 channel design provides an estimate accurate to within $+F/27$ Hz, or 3.7% of the maximum offset or error expected. For the $\pm 39$ kHz maximum offset assumed, this amounts to an accuracy no worse than $\pm 1.44$ kHz.

It is to be understood that the formation of two derivative channels from one primary channel is exemplary only; additional derivative channels may be created. Thus, instead of dividing the primary channel into two sets of phase correction circuits to obtain the vectors $P_1$ and $P_2$, three or more sets of circuits may be employed to divide the series of Equation 5 into three (or more) terms, and three (or more) derivative channels may be employed for the primary channel.

Figure 10:
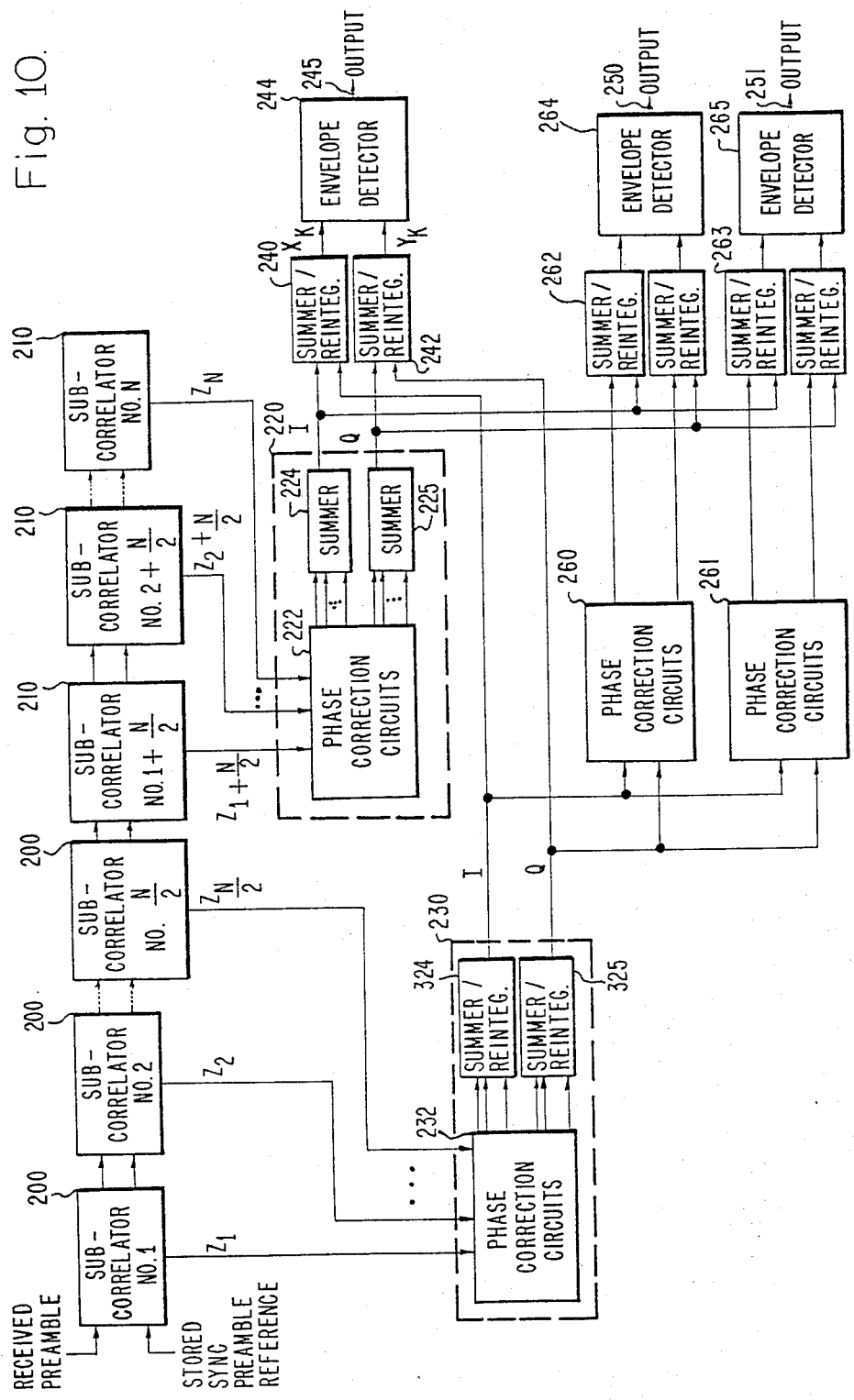
FIG. 10 is a block diagram of an alternate embodiment of the invention employing derivative channels.

FIG. 10 illustrates a block diagram of a SPCDFE with N subcorrelator circuits, employing two derivative channels based on each primary channel. The device operates in the following manner. The N subcorrelator circuits 200 and 210 are coupled as before, receiving as input signals the received sync preamble and the stored sync preamble reference. The N/2 complex subcorrelator output signals from subcorrelator 210, consisting of subcorrelators $1+N/2$ to N, are coupled to frequency sensitive network 220. The N/2 complex subcorrelator putput signals from subcorrelators 200, consisting of subcorrelators 1 to N/2, are coupled to frequency sensitive network 230.

The outputs of the frequency sensitive circuits 220 and 230 are used to form the kth primary channel, as well as two derivative channels. Phase correction networks 220, 230 each introduce phase shifts selected for particular frequency offset to which the kth channel is adapted to match. The phase correction circuits 222 and 232 are each adapted to introduce N/2 progressive phase shifts by the assumed frequency offset. The inphase and quadrature components of the outputs of the phase correction circuits 222,232 are respectively summed (linearly reintegrated) by summers/reintegraters 224,225 and 324,325. When forming the primary channel, the in-phase (I) and quadrature (Q) outputs of correction circuits 220 and 230 are summed (linearly reintegrated) separately by summers/reintegrates 240 and 242, respectively, to obtain $X_K$ and $Y_K$. $X_K$ and $Y_K$ are then envelope detected at detector 245, which performs the functions $(X_K^2+Y_K^2)^{\frac{1}{2}}$. (This function can be simplified by employing a linear approximation for the square law detection.) The output of detector 244 provides the k channel output on line 245.

When forming the derivative channels, the outputs of network 230 are phase corrected by phase correction circuits 260,261 at two different values, corresponding to two chosen frequency offsets slightly higher and lower than the center frequency of the kth channel. The phase correction applied by the respective circuits 260,261 corresponds to $N(\phi-\phi_k)2$. The respective phase corrected outputs of network 230 are then summed/reintegraters 262,263 with the outputs of network 220 and envelope detected (in detectors 264,265 to obtain the outputs of the first and second derivative channels on lines 250,251, respectively.

Figure 12:
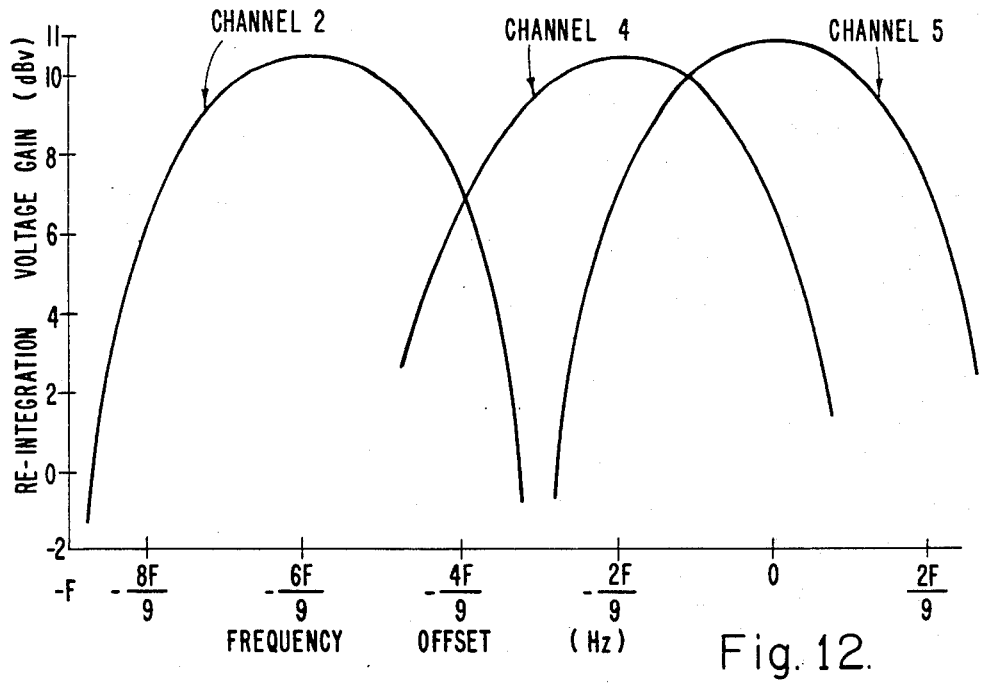
FIG. 12 is a graph illustrating the reintegration voltage gain calculated for an experimental, three-channel device in accordance with the invention.
Figure 11:
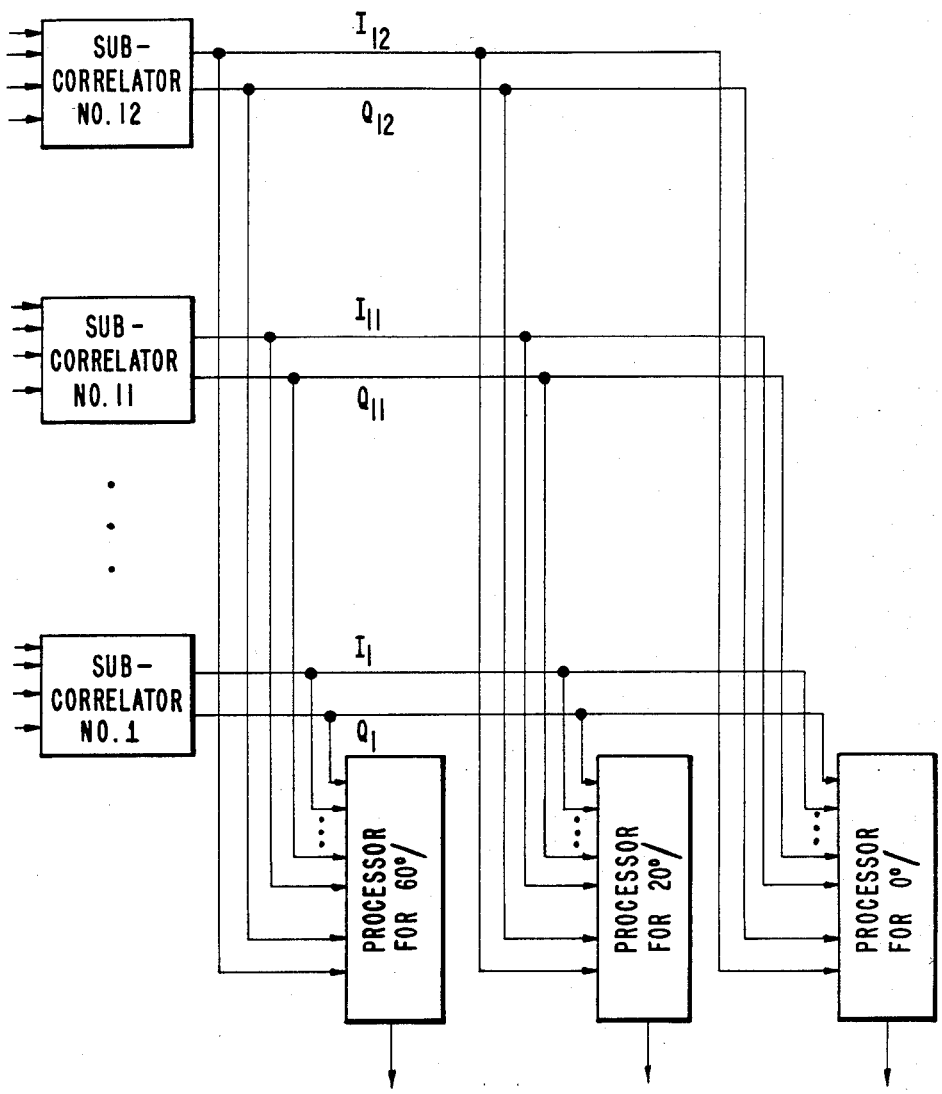
FIG. 11 is a block diagram of an experimental device employing three phase sensitive channels.

To demonstrate the frequency estimation capability of the SPCDFE, an experimental model was built which was based on the 9-channel design described above. A simplified block diagram of the device is shown in FIG. 11. The chip rate was 1 MHz, 12 subcorrelators were used, and each subcorrelator was 32 chips long. This results in a 384 chip preamble, which at the 1 MHz rate corresponds to 384 μsec in time duration. Only channel 2, 4 and 5 were implemented in the experimental device, corresponding to 0°, 20° and 60° phase shifts per subcorrelator. The computations performed to obtain the inphase and quadrature components of these channels involve the operations indicated by the first 12 terms of Equations 10 through 15. The channel output voltage level in dB computed from these six equations is shown in FIG. 12; one volt output is assumed for each subcorrelator. The fifth channel achieves perfect integration at zero frequency offset to yield 12 volts output or 10.8 dBv. The maximum output levels for the other two channels are about 10.4 dBv, indicating that the integration loss introduced by the approximation rule is only 0.4 dBv. Based on that channel having the largest output, the frequency estimate is accurate to ±F/9 Hz which would be 869 Hz if the worst case frequency error is ±7812 Hz.

It should be noted that the samples of the channel outputs would be compared against a fixed threshold to determine whether the sync preamble correlation has taken place. In the event that such a correlation is detected by a particular channel, an estimate of the frequency error can be derived from the highest channel output voltage along with those from the two adjacent channels. This information can be used for coarse correction of the receiver frequency prior to message demodulation. This allows the receiver frequency error to be reduced to within the pull-in range of a frequency tracking loop, which further reduces the frequency error to a tolerable amount.

Techniques of combining subcorrelator outputs in a semi-coherent manner have been described. The linear reintegration loss can be made smaller by employing larger numbers of reintegration channels. Since the novel reintegration technique only involves addition and subtraction of the subcorrelator outputs, the hardware required for implementing such a processor is reduced. For the 27-channel design example described, it has been found that the SPCDFE out-performs the conventional preamble correlation detector by 0.8 dB to 2.9 dB. If the 18 derivative channels were replaced by the same number of primary channels, it is believed that the performance improvement would be greater. More significantly, while performing sync preamble correlation, the device can be simultaneously employed as a maximum likelihood frequency estimator. For the 27-channel design described, the estimate accuracy is within the 3.7 percent of the maximum frequency offset expected. When desired, the quality of the estimate may be improved by refining the estimate using the measurements of the output level of two or more channels adjacent to one having the largest output in connection with calibration data for the channels.

It is intended that the above-described embodiment is merely illustrative of the many possible specific embodiments which can represent principles of the present invention. Numerous and varied other arrangements can readily be devised in accordance with these principles by those skilled in the art without departing from the spirit and scope of the invention.

What is claimed is:

1. A synchronization preamble correlation detector for a spread spectrum receiver adapted to operate in the presence of frequency offsets in a received signal from a nominal signal frequency, comprising:

means for providing reference synchronization (sync) preamble signal;

receiver means for providing the received sync preamble signal;

a plurality of subcorrelator circuits responsive to said reference preamble signal and said received preamble signal, each adapted to provide a subcorrelator signal indicative of the extent of matching between respective predetermined portions of said reference signal and said received signal; and a plurality of frequency sensitive channels each respectively adapted to match a predetermined frequency offset subband, each channel comprising:

(i) means for providing predetermined phase corrections to said subcorrelator signals in dependence upon the frequency offset subband to which the respective channel is adapted to match so as to provide phase corrected subcorrelator signals; and (ii) means for combining said phase corrected subcorrelator signals and providing a channel output signal.

2. The invention of claim 1 wherein said means for providing predetermined phase corrections provides approximated phase corrections, whereby multiplication operations are avoided.

3. The invention of claim 2 wherein said means for providing predetermined phase corrections is adapted to provide phase corrections of 0°, 90°, 180° or 270° in dependence upon which of these values is closest to the phase correction for exact phase compensation.

4. The invention of claim 3 wherein said subcorrelator signals are complex signals which are represented by $I+jQ$, where I represents the in-phase component and Q the quadrature component, and wherein said means for providing said phase corrections of 0°, 90°, 180° and 270° comprises means for respectively modifying such subcorrelator output $I+jQ$ as follows:

(a) for 0° phase correction, do not modify $I+jQ$;
   (b) for 90° phase correction, replace $I+jQ$ by $-I-jQ$;

(c) for 180° phase correction, replace I+jQ by −Q+jI; and (d) for 270°, replace I+jQ by +Q−jI.

5. The invention of claim 1, further comprising means for estimating the frequency offset of signals received by said spread spectrum receiver.

6. The invention of claim 5 wherein said estimating means comprises means for comparing the magnitudes of said channel output signals and determining that channel having the largest signal amplitude.

7. The invention of claim 6 wherein said estimating means is adapted to determine the channel having the largest output signal and provide a signal indicative of the estimated frequency offset of the received signal.

8. A synchronization preamble correlation detector for a spread spectrum radio frequency (RF) receiver, wherein the frequency offset of a received signal is within a frequency uncertainty bandwidth, comprising:

means for providing a reference synchronization preamble signal;

means for providing a received preamble signal;

a number, N, of subcorrelator circuits, each responsive to said received signal and said reference signal and adapted to provide a subcorrelator signal indicative of the correlation between respective predetermined chips of said received signal and said reference signal;

a number, k, of frequency sensitive channels responsive to said subcorrelator signals, each of said channels adapted to match a predetermined frequency region within said frequency uncertainty bandwidth and comprising:

(i) means for providing successive predetermined phase shifts to said subcorrelator signals in dependence upon said frequency regions so as to provide phase corrected subcorrelator signal; and (ii) means for reintegrating said phase corrected subcorrelator signals and providing a channel output signal.

9. The invention of claim 8 wherein said means for providing predetermined phase shifts is adapted to provide phase shifts of 0°, 90°, 180° or 270° to said subcorrelator signals, whichever is closest to the exact phase shift required to obtain coherence among the subcorrelator outputs.

10. The invention of claim 8 further comprising means for determining an estimate of the frequency of said received preamble signals, comprising means for determining that channel having the largest channel output.

11. The invention of claim 8 further comprising means for determining whether correlation of said received preamble signal with said reference sync signal has occurred, comprising means for comparing the magnitude of said respective channel outputs with a predetermined threshold value.

12. A synchronization preamble correlation detector for a spread spectrum radio frequency (RF) receiver, wherein the frequency of a received signal is within a frequency uncertainty bandwidth, comprising:

means for providing a reference synchronization (sync) preamble signal;

means for providing a reference sync preamble signal;

a number, N, of subcorrelator means, each responsive to said received signal and said reference signal and adapted to provide a subcorrelator signal indicative of the extent of correlation between respective predetermined portions of said reference signal and said received signal;

a number, k, of frequency sensitive primary channels responsive to the subcorrelator output signals, each respectively adapted to match a predetermined frequency offset subband within the frequency uncertainty bandwidth, each channel comprising:

first phase correction means responsive to the output signals of a first predetermined set of said subcorrelator means and adapted to provide predetermined phase corrections to said subcorrelator signals;

second phase correction means responsive to the output signals of a second predetermined set of said subcorrelator means, and adapted to provide predetermined phase corrections to subcorrelator signals;

first summing means adapted to sum the phase corrected outputs from said first set of subcorrelators and provide a first primary composite signal;

second summing means adapted to sum the phase corrected outputs of said second set of subcorrelators and provide a second primary composite signal; and third summing means adapted to sum said first composite signal and said second composite signal and provide a primary channel output signal; and at least one frequency sensitive derivative channel adapted to match a predetermined frequency offset subband within the frequency uncertainty bandwidth, said derivative channel responsive to said first and said second composite signals of a predetermined one of said primary channels, said derivative channel comprising:

a third phase correction means adapted to apply a phase correction to said first composite signal in dependence upon the frequency relation of the respective frequency offset subbands of said primary channel and the derivative channel; and fourth summing means for summing the phase corrected first composite signal and said second composite signal to provide a derivitive channel output signal.

13. The invention of claim 12 wherein the frequency subbands of the primary and derivitive channels collectively cover the frequency uncertainty bandwidth.

14. The invention of claim 12 wherein said first and second phase correction means of said primary channel are respectively adapted to provide predetermined phase corrections in dependence upon the frquency offset subband to which the respective channel is adapted to match.

15. The invention of claim 14 wherein said first and second phase correction means are adapted to provide approximated phase corrections of 0°, 90°, 180° or 270° depending upon which of these values is closest to the phase correction for exact phase compensation.

16. The invention of claim 15 further comprising means for estimating the frequency of signals received by said spread spectrum receiver.

17. The invention of claim 16 wherein said frequency estimating means comprises means for comparing the amplitudes of the primary and derivitive channels and determining that channel having the largest output signal.

18. A synchronization preamble correlation detector and frequency estimator for a spread spectrum radio frequency (RF) receiver, wherein the frequency of the received signal is within a frequency uncertainty bandwidth, comprising:

means for providing a reference synchronization (sync) preamble signal;

means for providing a received sync preamble signal;

a plurality of subcorrelator circuits responsive to said reference preamble signal and said received preamble signal, each adapted to provide a subcorrelator signal indicative of the extent of correlation between respective predetermined chips of said reference signal and said received signal;

a plurality of frequency sensitive channels each respectively adapted to match a predetermined frequency offset subband within said frequency uncertainty bandwidth, each channel comprising:

means for providing approximated predetermined phase corrections to said subcorrelator signals in dependence upon the frequency offset subband to which the respective channel is adapted to match, said means adapted to provide phase corrections of 0°, 90°, 180° or 270° in dependence upon which of these values is closest to the phase correction for exact phase compensation; and means for combining said phase corrected correlator signals and providing a channel output signal; and estimating means for estimating the frequency of signals received by said spread spectrum receiver, comprising means for determining that channel whose output is indicative of the highest correlation.

* * * * *

UNITED STATES PATENT AND TRADEMARK OFFICE
CERTIFICATE OF CORRECTION

PATENT NO.  : 4,621,365
DATED       : November 4, 1986
INVENTOR(S) : C. S. CHIU

It is certified that error appears in the above-identified patent and that said Letters Patent is hereby corrected as shown below:

Column 10, line 6, -- $\phi - \phi_k = 10°$ -- instead of "$\phi - \phi_k - 10°$".

Column 12, line 31, -- $\pm$ F/27 -- instead of "+ F/27".

Column 13, line 4, --summers/reintegraters-- instead of "summers/reintegrates"

Column 13, lines 18, 19 --summed (linearly reintegrated) in summers/reintegraters-- instead of "summed/reintegrators".

Column 15, line 19 insert after "synchronization" --(sync)--.

Signed and Sealed this

Eighteenth Day of August, 1987

*Attest:*

DONALD J QUIGG

*Attesting Officer*   Commissioner of Patents and Trademarks